United States Patent [19]
Artigue et al.

[11] Patent Number: 6,093,939
[45] Date of Patent: Jul. 25, 2000

[54] HYBRID OPTICAL MODULE INCLUDING AN INTERMEDIATE ELEMENT

[75] Inventors: Claude Artigue, Bourg la Reine; Denis Tregoat, Gif sur Yvette; Franck Mallecot, Montrouge; Emmanuel Grard, St Michel sur Orge, all of France

[73] Assignee: Alcatel, Paris, France

[21] Appl. No.: 09/028,816

[22] Filed: Feb. 24, 1998

[30] Foreign Application Priority Data

Feb. 24, 1997 [FR] France ................................. 97 02165

[51] Int. Cl.⁷ .................................................. H01L 33/00
[52] U.S. Cl. .............................. 257/99; 257/98; 257/432; 257/433; 385/92; 385/94
[58] Field of Search .............................. 257/98, 99, 432, 257/433; 385/88, 92, 94; 372/50

[56] References Cited

FOREIGN PATENT DOCUMENTS

| | | |
|---|---|---|
| 0118185A1 | 9/1984 | European Pat. Off. . |
| 4401219A1 | 7/1995 | Germany . |
| WO9325924 | 12/1993 | WIPO . |

OTHER PUBLICATIONS

I. Kitazawa et al, "Thermal Resistance and Soldering Stress Analyses on LD–Mount–Structures for Planar Lightwave Circuits", IOOC '95, 1995, pp. 28–29.

D. Peters et al, "Integrated Optical Devices with Silicon Oxynitride Prepared by PECVD on Si and GaAs Substrates", SPIE, Physical Concepts of Materials for Novel Optoelectronics Device Applications II: Device Physics and Applications, vol. 1362, Oct. 28, 1990–Nov. 2, 1990, AACHEN, pp. 338–349.

*Primary Examiner*—Minh Loan Tran
*Attorney, Agent, or Firm*—Sughrue, Mion, Zinn, Macpeak & Seas, PLLC

[57] ABSTRACT

A hybrid optical device includes a passive component coupled optically to an active component, the passive component being formed in layers of silica on a substrate made of silica, the layers and the substrate thus forming a silica-on-silica structure. The hybrid optical device includes an intermediate element having good thermal conductivity and a coefficient of thermal expansion similar to that of the active component, wherein the active component is fixed to the intermediate element prior to insertion into the cavity, and the intermediate element is fixed to the structure so that the active component is located inside the cavity and is coupled optically to the passive component.

9 Claims, 5 Drawing Sheets

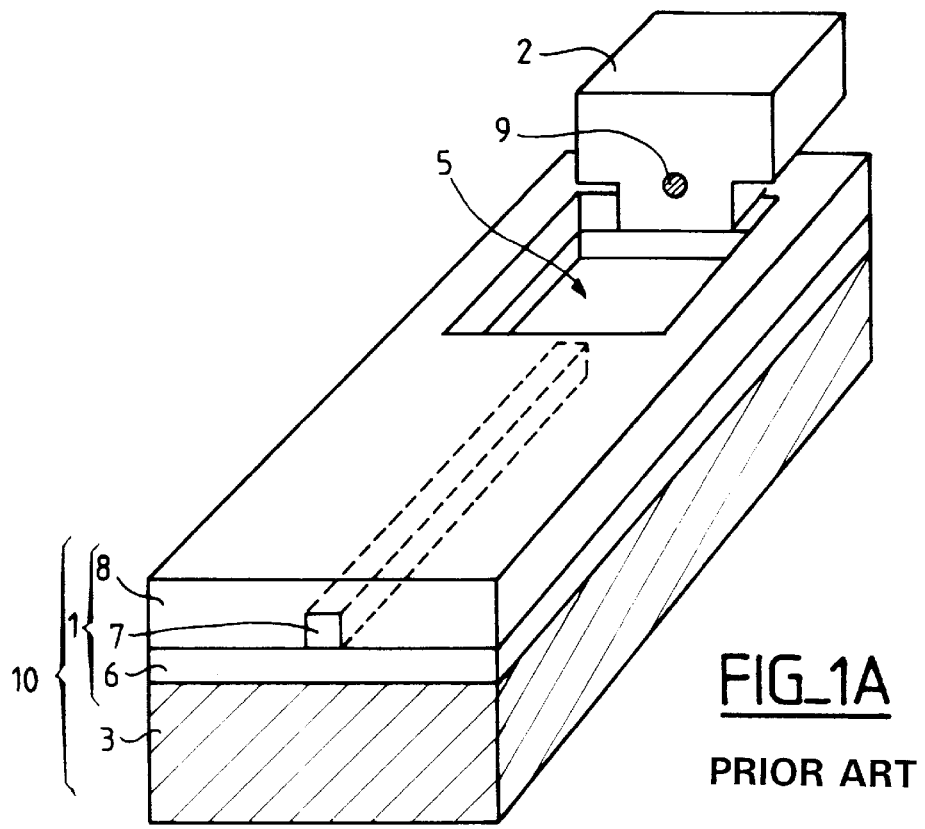
FIG_1A
PRIOR ART
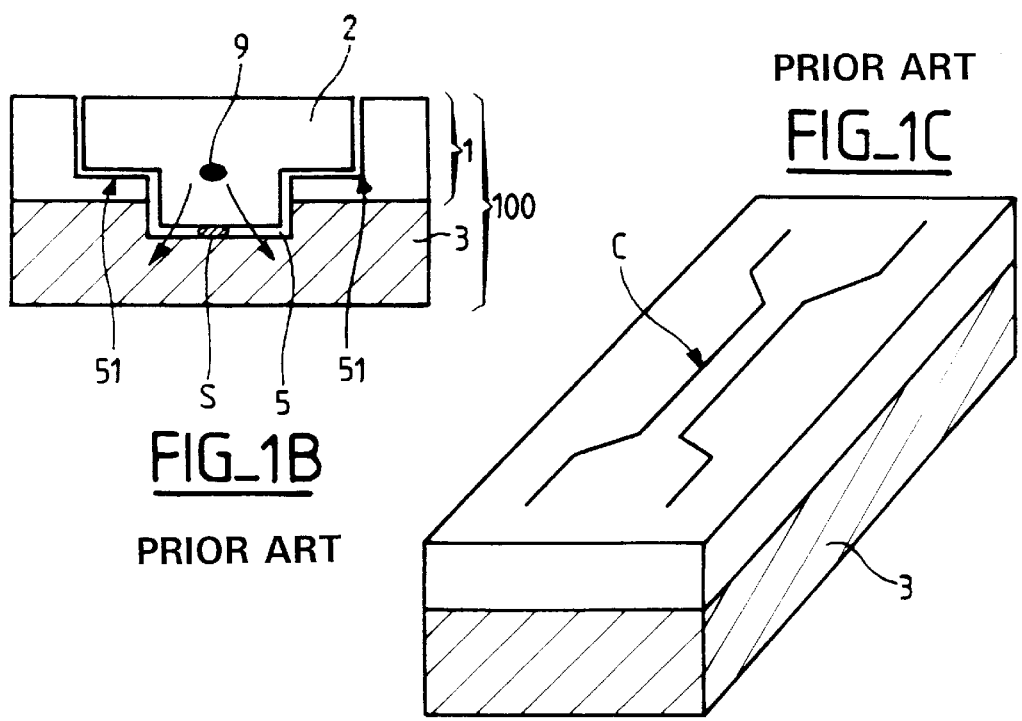
FIG_1B
PRIOR ART
PRIOR ART
FIG_1C

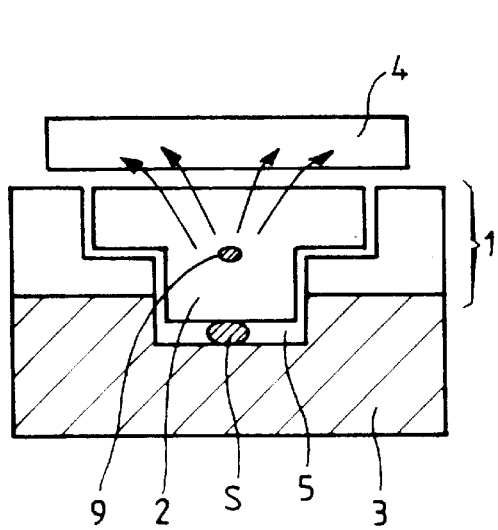
FIG_2A
PRIOR ART
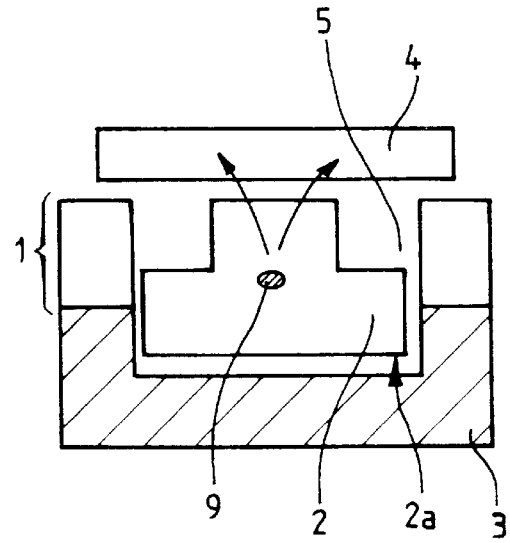
FIG_2B
PRIOR ART
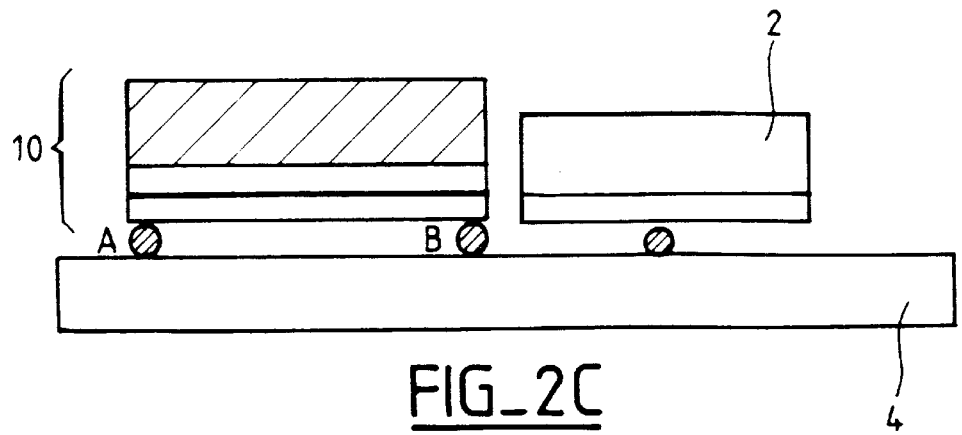
FIG_2C
PRIOR ART

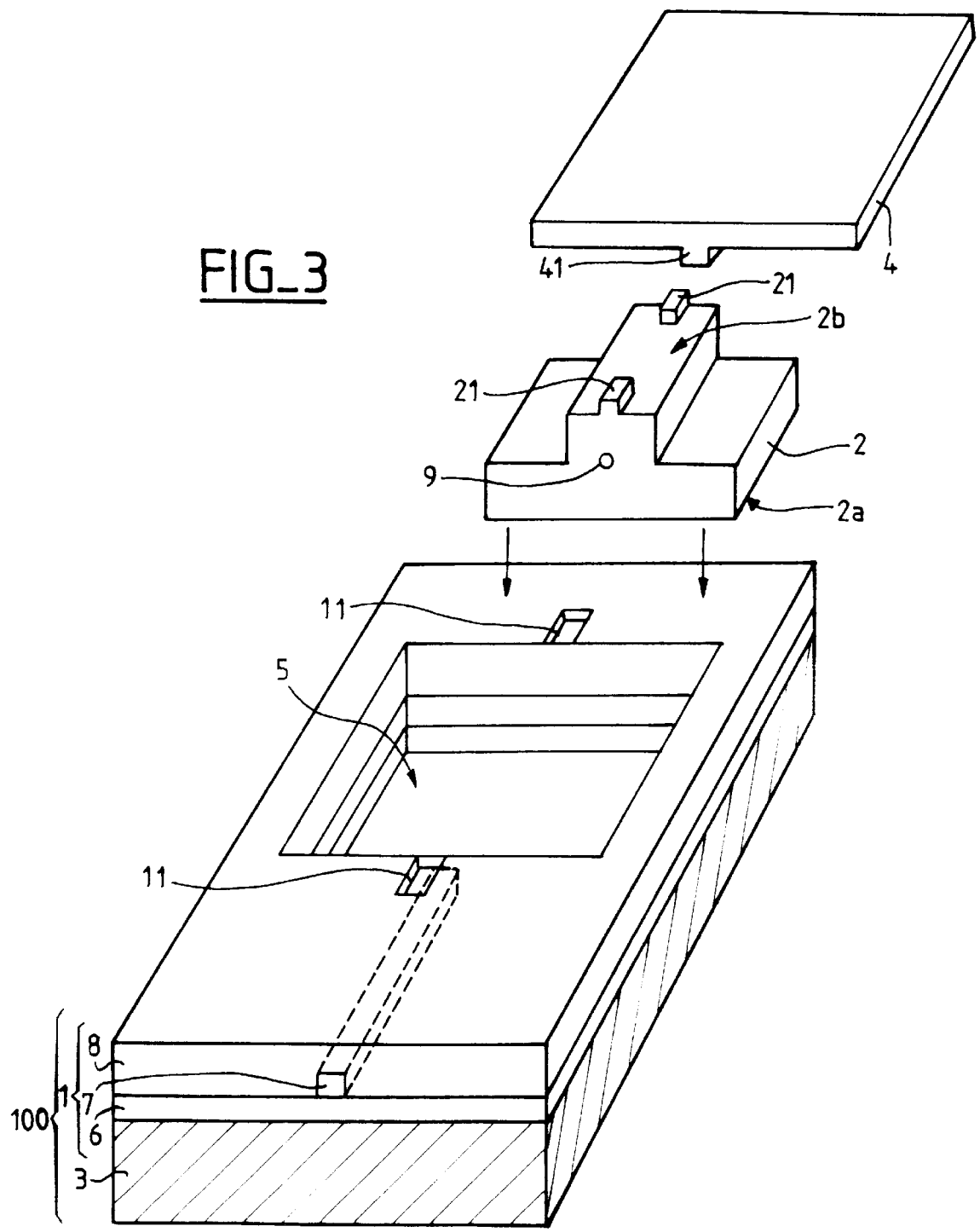
FIG_3

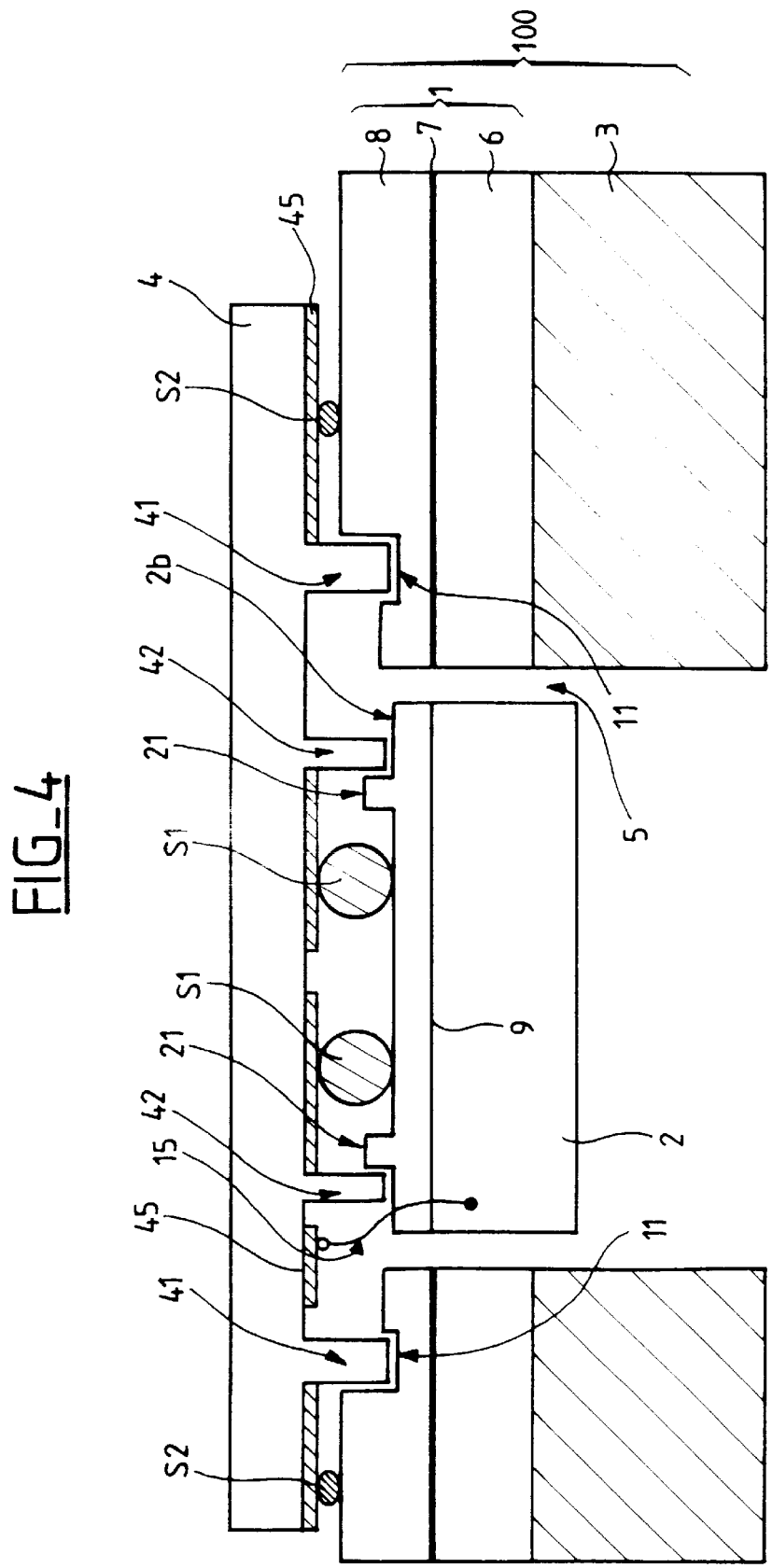
FIG_4

FIG_5
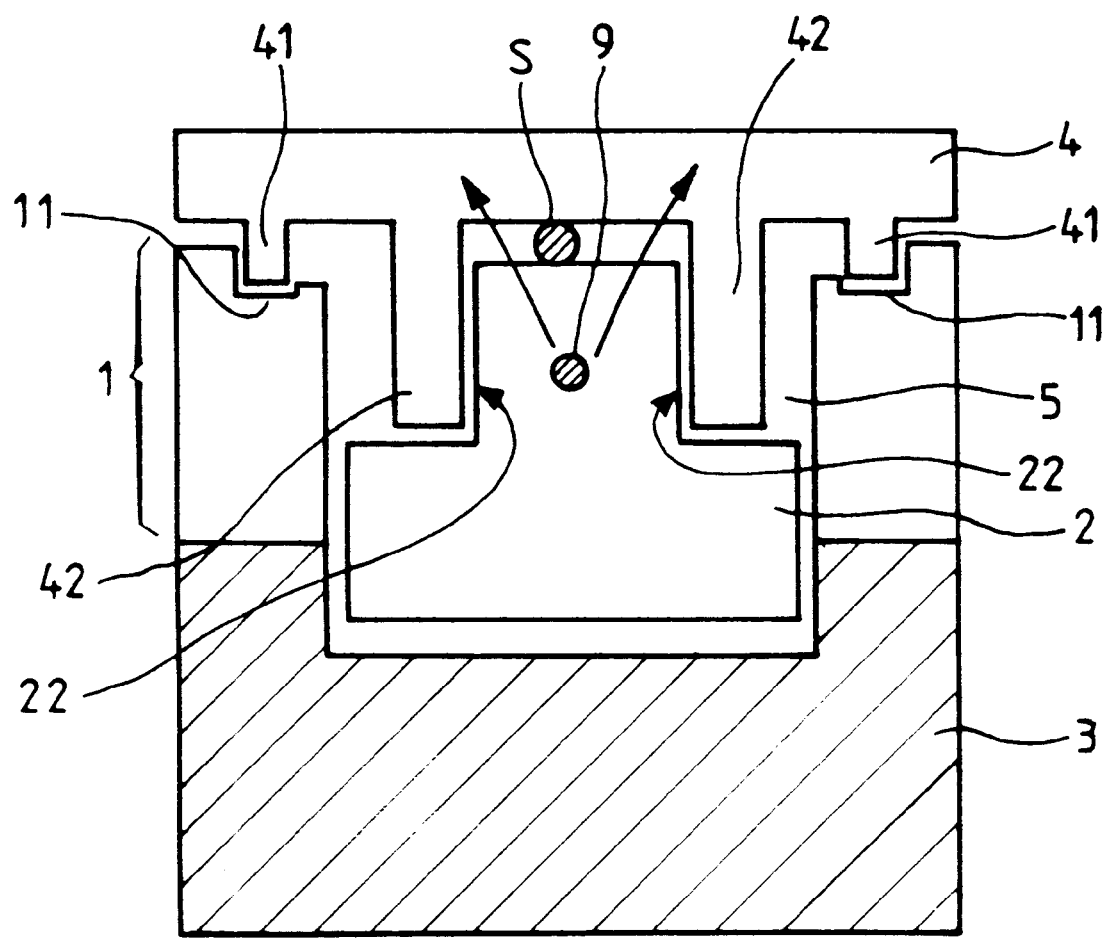

HYBRID OPTICAL MODULE INCLUDING AN INTERMEDIATE ELEMENT

The present invention relates to a method of assembling a hybrid optical device. A hybrid optical device is defined as being an element including an active opto-electronic component coupled optically to a passive component. Such an element is designed to be enclosed in an optical module to which a plurality of optical fibers can be connected.

BACKGROUND OF THE INVENTION

Hybrid optical devices have already been made in the prior art. In particular, elements exist that are as shown in the perspective diagram of FIG. 1A. Such an element includes a passive component 1 made of silica and an opto-electronic component 2, e.g. of the laser type or of the optical amplifier type, both components being supported by a substrate 3 made of silicon.

The passive component 1 is, in fact, made up of a stack of three successive layers of silica 6, 7, and 8 on the silicon substrate 3. The second layer 7 of silica is etched into a special shape, and it constitutes the light guide of the passive component 1. In the example shown in FIG. 1A, the light guide is rectilinear, but it may be in some other shape depending on the function that it is to perform. The second layer of silica 7 is so made that it has a higher refractive index than the other two layers 6 and 8. The second layer 7 is thus equivalent to the core of an optical fiber, while the other two layers 6 and 8 are equivalent to the cladding of such an optical fiber.

The assembly made up of the silicon substrate 3 and of the layers of silica 6, 7, and 8 forming the passive component is commonly referred to as a silica-on-silicon structure 10 and abbreviated "SiO$_2$/Si"

A recess 5 is defined in the layers of silica 6, 7, and 8, and in the vicinity of the silicon substrate 3. The opto-electronic component 2 is then placed inside the recess 5 such that its optical axis 9 is in alignment with the light guide 7 of the passive component 1.

The alignment between the optical axis 9 of the active component 2 and the light guide 7 of the passive component 1 must be very accurate, i.e. accurate to within about one micron ($\mu$m) or less (1 $\mu$m=10$^{-6}$ meters). For this purpose, the cavity 5 must have a structure that enables the opto-electronic component 2 to be locked in position, as shown in the cross-section view of FIG. 1B. As shown in FIG. 1B, the cavity 5 is provided with steps 51 so as to match the shape of the active component. In addition, the dimensions of the cavity 5 are defined with accuracy to within one micron or less. A solder spot S enables the active component 2 to be fixed to the bottom of the cavity.

The arrows shown in FIG. 1B indicate the direction in which the heat given off by the opto-electronic component 2 is removed.

That type of hybrid optical element is disclosed, in particular, in the document entitled "Thermal resistance and soldering stress analyses on LD-mount-structures for planar lightwave circuits", I. Kitazawa et al. IOOC '95, FA3-5, pp 26–29.

However, that type of hybrid optical element is only in very limited use. This is essentially because silicon has a coefficient of thermal expansion that is very different from the coefficient of thermal expansion of silica. As a result, after the successive layers 6, 7, and 8 of silica have been deposited at a temperature lying in the range 400° C. to 1400° C. on the silicon substrate, and after the resulting assembly has been cooled to ambient temperature, the silica-on-silicon structure thus obtained has a curved, very deformed shape. That deformation gives rise to stresses that propagate through the various layers of silica.

Such stresses are not problematic when a straight guide is to be made, but they do constitute a major drawback when other types of passive component are to be made such as, for example, a power divider, i.e. a coupler having 3 dB losses.

Optical polarization rotates in optical fibers. When light coming from one optical fiber is injected into a 3 dB coupler, it is essential to have a component that is capable of dividing the optical power regardless of polarization. The stresses generated in the layers of silica make the passive function of such a coupler sensitive to polarization, and, as a result, that type of passive component cannot operate correctly.

One solution to that problem is shown in FIG. 1C and consists in using a support 3 made of fused silica, i.e. of amorphous silica. Such a structure is referred to as a silica-on-silica structure and is abbreviated "SiO$_2$/SiO$_2$". In the example shown, the passive component is a coupler C. In that case, the substrate 3 and the layers of silica defining the coupler C have coefficients of thermal expansion that are very close to each other so that no stress is generated in the layers of silica. The passive component is then insensitive to polarization.

Such a solution is described, for example, in the article entitled "Prospects for silica and glass-based IO components" by S. Kobayashi et al, ECIO '95, We A3, pp 309–314.

However, unlike silicon, fused silica is a poor dissipator of heat. Unfortunately, when making a hybrid optical element, it is necessary to remove the heat given off by the opto-electronic component.

The problem to be solved thus consists in finding means making it possible to make a hybrid optical element on a fused silica substrate, such an element including both an active component and a passive component, the two components being coupled optically to each other.

A first solution that comes to mind to solve that problem is shown in the diagrammatic cross-section view given in FIG. 2A. That solution consists in covering the active component 2 with a silicon support 4 suitable for dissipating the heat given off by the active component. The direction in which the heat given off is removed is indicated by arrows in FIG. 2A.

However, that first solution is not optimal because it suffers from a major drawback. The heat is removed via the active component 2 and that upsets operation of the component considerably. In addition, the qualities of the opto-electronic component are reduced considerably, such as is its life span.

Moreover, in that case, the means for holding the silicon support 4 are not defined. Said the support can optionally be glued to the silica-on-silica structure. In any event, the support does not contribute to aligning the active component with the passive component. It is only the shape of the cavity 5 and the solder spot S that make it possible to achieve the alignment, as in the above-described prior art corresponding to FIGS. 1A and 1B.

To avoid heat being removed via the opto-electronic component, another solution consists in turning the component the other way up as shown in FIG. 2B. In that case, the heat is removed to the silicon support 4 via the shortest route, without passing through the active component 2. The silicon support 4 acts as a heat pathway.

The back face 2a of the opto-electronic component 2 is thinned by polishing with an accuracy of ±10 μm, without reference to the active function 9. The heat pathway 4 is mounted in the vicinity of the optical axis 9 of the opto-electronic component 2. Such a heat pathway is intended to act as a heatsink only. In addition, it can optionally serve to encapsulate the chip 2. But it can in no way contribute to aligning the optical axis 9 of the active component correctly relative to the light guide of the passive component 1 because such an alignment function is incompatible with the large tolerances (±10 μm) for thinning of the back face 2a of the opto-electronic component. As a result, the second solution is also unsatisfactory.

Another type of hybrid optical device has been proposed in the prior art, and it is shown in the diagrammatic longitudinal section view given in FIG. 2C. That device includes an opto-electronic component 2, a heat pathway or "bridge" made of silicon 4, and a silica-on-silicon structure 10 on which at least one passive component is implemented. That structure 10 can also be a silica-on-silica structure.

In that case, the silicon bridge 4 serves both as a heatsink and as a support that is common to the active component 2 and to the silica-on-silicon structure 10.

To support the two types of component, it is thus necessary for the area of the bridge 4 to be relatively large, i.e. typically greater than 0.1 cm$^2$. That area can be as much as a few square centimeters. The silica-on-silicon structure 10 is fixed to the bridge 4 at two points referred to as "support points" A and B. The distance between the two support points A and B is of the same order of magnitude as the size of the structure 10. It is therefore relatively long, and can lie in the range 1 mm to a few centimeters.

That long distance gives rise to problems of shear stress generated at the support points A and B during standard telecommunications applications which are performed at temperatures that can vary in the range −40° C. to +85° C. Such shear stress problems are due to the difference between the coefficients of thermal expansion of the silicon of the bridge 4 and of the silica of the silica-on-silicon structure 10 or of the silica-on-silica structure.

OBJECTS AND SUMMARY OF THE INVENTION

The present invention makes it possible to mitigate all of the above-mentioned drawbacks because it provides a method of assembling a hybrid optical device, in which method a silicon support is used that is capable both of dissipating heat given off by the active component, and of aligning the optical axis of the component relative to the light guide of the passive component.

More particularly, the invention provides a method of assembling a hybrid optical device including a passive component coupled optically to an active component, the passive component being formed in layers of silica on a substrate made of silica, the layers and said substrate thus forming a silica-on-silica structure, the method consisting in:

making an intermediate element having good thermal conductivity and a coefficient of thermal expansion similar to that of the active component;

fixing the active component to the intermediate element; and forming a cavity in the silica-on-silica structure and fixing the intermediate element to the structure so that the active component is located inside the cavity and is coupled optically to the passive component.

According to another characteristic of the invention, the method further consists in forming abutments on the intermediate element, keying means on the active component, and markings on the silica-on-silica structure, so as to position abutments of a first type against the keying means of the active component, and so as to position abutments of a second type against the markings in the silica-on-silica structure.

According to another characteristic of the invention, the intermediate element is made of silicon.

The invention further provides a hybrid optical device including an active component coupled optically to a passive component, the passive component being formed in layers of silica on a substrate made of silica, said layers and the substrate thus forming a silica-on-silica structure, the device further including an intermediate element having good thermal conductivity and a coefficient of thermal expansion similar to that of the active component, and a cavity provided in the silica-on-silica structure, and the intermediate element is assembled both to the active component and to the silica-on-silica structure so that the active component is located inside the cavity and is coupled optically to the passive component.

According to another characteristic of the invention, the intermediate element includes abutments suitable for being positioned firstly against keying means situated on the active component, and secondly against markings situated in the silica-on-silica structure.

According to another characteristic of the invention, the intermediate element is made of silicon.

According to another characteristic of the invention, the intermediate element has a small size and its area is very slightly greater than the area of the active component.

According to another characteristic of the invention, the intermediate element has an area smaller than one square millimeter, and the silica-on-silica structure has an area larger than a few square millimeters.

According to another characteristic of the invention, the active component is mounted "the right way up" in the cavity.

According to another characteristic of the invention, the cavity is a non-through cavity, and the intermediate element is placed above the cavity so as to participate in encapsulating the active component.

The hybrid optical device of the invention offers numerous advantages in particular because the fused silica substrate is cheap, and because, by using it, the design of optical systems based on components that are insensitive to polarization can be simplified considerably.

The method of assembly of the invention can also be applied to manufacturing access components of the "Transmit-Receive Device (TRD)" type, or to switching. The advantages for both of these types of application, i.e. for TRD-type components and for switching, result firstly from the fact that, since the method of the invention uses plane elements, it is compatible with mass production, and secondly from the fact that silica-on-silica components are used that are insensitive to optical polarization, thereby making it possible to simplify in-line circuits. In addition, the heatsink is very important for switching applications in which the density of opto-electronic components on the structure is high.

BRIEF DESCRIPTION OF THE DRAWINGS

Other features and advantages of the invention appear on reading the following description given by way of non-limiting example and with reference to the accompanying figures, in which:

FIG. 1A (described above) is a diagrammatic perspective view of a prior art hybrid optical element;

FIG. 1B (described above) is a diagrammatic cross-section view of the element shown in FIG. 1A;

FIG. 1C (described above) is a diagrammatic perspective view of a prior art passive component of the 3 dB coupler type;

FIG. 2A (described above) is a diagrammatic cross-section view of another prior art hybrid optical element;

FIG. 2B (described above) is a diagrammatic cross-section view of another hybrid optical element;

FIG. 2C (described above) is a diagrammatic longitudinal section view of another prior art hybrid optical device;

FIG. 3 is a diagrammatic perspective view of a hybrid optical element of the invention;

FIG. 4 is a diagrammatic longitudinal section view of the element shown in FIG. 3; and FIG. 5 is a diagrammatic cross-section view of a variant embodiment of a hybrid optical element of the invention.

DETAILED DESCRIPTION OF THE PREFERRED EMBODIMENTS

FIG. 3 shows the structure of a hybrid optical element of the invention, and enables the manner in which it is assembled to be better understood. This hybrid optical element includes an active opto-electronic component 2, e.g. of the laser type or of the optical amplifier type, also referred to as a "chip", and a passive component 1 of the rectilinear light guide type or of the 3 dB coupler type, or of some other type.

The passive component 1 is made using a known method by stacking up successive layers 6, 7, and 8 of silica on a substrate 3 made of fused silica. The intermediate layer 7 constitutes the core of the passive component, and it is etched into a special shape depending on the function of the light guide to be made. The other two layers 6 and 8 constitute the cladding of the passive component. The fused silica substrate makes it possible to prevent stresses from forming in the layers 6, 7, 8 of silica, and thus enables a passive component to be obtained that is of good quality and that is insensitive to polarization. In the following description, the assembly formed by the passive component 1 and by the silica substrate 3 is referred to as the "silica-on-silica structure", and is referenced 100.

In a variant embodiment, the core 7 of the passive component may also be formed in a layer of silicon nitride ($Si_3N_4$).

A cavity 5 is provided in the silica-on-silica structure 100, i.e. in or through the successive layers 6, 7, 8 of silica, and optionally into or through the substrate 3, to enable the opto-electronic component 2 to be received therein. The cavity 5 may be chosen either to be a through cavity or to be a non-through cavity, the choice usually being made on the basis of manufacturing cost and of whether or not the active component 2 needs to be encapsulated. The opto-electronic component 2 is inserted in the cavity 5 in a manner such that its optical axis 9 is in alignment with the light guide 7 of the passive component 1.

For example, the opto-electronic component 2 may be a laser of the GaInAsP-on-InP type made in conventional manner by epitaxy and having power lying in the range 1 mW to 200 mW. Prior to being inserted into the cavity 5, the laser 2 is fixed, e.g. by soldering, to an intermediate element 4 serving to dissipate the heat given off. The size of the intermediate element is relatively small, its area is very slightly larger than that of the cavity 5, i.e. than that of the active component 2. The chip 2 is inserted into the cavity 5 in a manner such that it is mounted "the right way up". Conversely, it is placed "upside down" on the intermediate element 4, and it may be said to be a "flip chip" mounted thereon.

In addition, to enable the optical axis 9 of the laser 2 be aligned relative to the light guide 7 of the passive component 1, it is necessary to be able to position the heatsink 4 very accurately relative both to the laser 2 and to the passive component 1. For this purpose, abutments or keying means are provided on the intermediate element 4, on the active component 2, and on the passive component 1. For example, such keying means may be formed by lithography, by Reactive Ion Etching (RIE), or by any other etching method.

In this way, abutments (not visible in FIG. 3) are formed on the bottom surface of the heatsink 4 in a manner such that they can come into position against keying means 21 provided, for example, on the front surface 2b of the laser 2. Likewise, abutments 41 are provided on the bottom surface of the heatsink 4 in a manner such that they can come into position against markings, or in recesses 11 such as those shown in the example given in FIG. 3, provided in the top surface of the silica-on-silica structure 100.

Since the intermediate element 4 is positioned both relative to the laser 2 and relative to the passive component 1, the active component and the passive component are positioned relative to each other via a transitive relationship.

The abutments on the heatsink are positioned against keying means 21 of the laser 2 very accurately, to within less than one micron.

In the same way, the abutments 41 on the heatsink are provided such that they can be positioned against the markings 11 in the structure 100 with great accuracy, to within less than one micron.

In the example shown in FIG. 3, the markings 21 in the laser 2 are aligned with its optical axis 9, the keying means 11 on the passive component 1 are aligned with the silica light guide 7, and the two types of abutment on the intermediate element 4 are aligned respectively with the keying means on the laser and with the keying means on the passive component. Naturally, the locations of the abutments and keying means are given merely by way of example. They may be placed otherwise, provided that they make it possible to fix the active component and the passive component relative to the heatsink 4, and thus relative to each other.

To simplify FIG. 3, the light guide 7 of the passive component 1 is shown rectilinear, but it may be of more complex shape, and, in particular, it may, for example, be a 3 dB coupler.

FIG. 4 is a diagrammatic longitudinal section view of the hybrid optical element shown in FIG. 3. The same references as in FIG. 3 are used to designate like elements. The passive component 1 is made up of a stack of layers of silica 6, 7, and 8. It includes a core 7, or light guide, etched to the desired dimensions and embedded in the cladding layers 6 and 8. In this example, the cavity 5 provided in the layers of silica of the passive component and in the substrate 3 is a through cavity. This cavity 5 can receive the active opto-electronic component 2 in a manner such that the optical axis 9 thereof is aligned with the light guide 7 of the passive component 1. The chip 2 is fixed by means of solder spots S1 to electrical connections 45 on the intermediate element 4 that acts as a heatsink.

The heatsink 4 is preferably made of silicon because silicon has a coefficient of thermal expansion similar to that of the GaInAsP/InP chip 2, so that it makes it possible to prevent shear stresses from being generated that could propagate in particular to the solder spots S1 between the chip 2 and the intermediate element 4.

Naturally, the intermediate element 4 may be made of other materials such as alumina ($Al_2O_3$) or gallium arsenide (GaAs), for example. However, GaAs is more expensive than silicon, and $Al_2O_3$ does not enable abutments to be made with such great accuracy (to within less than one micron) so as to enable the optical axis of the active component to be aligned very accurately with the optical axis of the passive component.

In the example described, the substrate 3 is made of fused silica. In a variant embodiment, it may optionally be made of quartz but quartz is more expensive than silica.

Furthermore, abutments 42 provided on the bottom surface of the heatsink 4 are designed to come into position snugly against the keying means 21 provided on the front face 2b of the laser 2.

Other abutments 41 are provided on the bottom surface of the heatsink 4 so as to be received against markings 11 provided in the top surface of the silica-on-silica structure 100. The silica-on-silica structure 100 is further fixed to the heatsink 4 by solder spots S2 applied to the electrical connections 45 thereof.

The abutments 41, 42 on the intermediate element 4, the keying means 21 on the laser 2 and the markings 11 in the passive component 1 are, in the example shown in FIG. 4, aligned with the optical axis 9 of the laser and with the light guide 7 of the passive component.

It should also be noted that the silica-on-silica structure 100 used to make the hybrid optical device of the invention has large dimensions. Its area is greater than a few square millimeters, and it can be as much as a few tens of square centimeters. In contrast, the "heat bridge" or heatsink 4 used in the present invention has an area that is small, and less than one square millimeter. This small area makes it possible to limit the distance between the two solder spots S2 implemented between the silica-on-silica structure 100 and the heatsink 4, and, as a result, to limit in particular the risks of shear stresses occurring during standard telecommunications uses because of the difference between the coefficient of thermal expansion of silicon and the coefficient of thermal expansion of silica, such uses being made at temperatures that can vary in the range −40° C. to +85° C. This thus constitutes a major advantage over the prior art described above and corresponding to FIG. 2C.

The chip 2 is "flip chip" mounted on the intermediate element 4. The zone beneath the optical axis 9 is doped with carriers of a first type, e.g. of the n type, while the zone situated above the optical axis 9 is doped with carriers of a second type, e.g. of the p type. The solder spots S1 serving to connect the chip to the heatsink thus represent electrodes of a second type (positive electrodes in the example). For example, the electrode of the first type (the negative electrode in the example) may be constituted by a conductor wire 15 soldered both to the connections 45 on the heatsink and to the zone of the laser 2 that is doped with n-type carriers.

FIG. 5 is a diagrammatic cross-section view of a variant embodiment of a hybrid optical device of the invention. In this case, the abutments 41 and 42 on the intermediate element 4 are not aligned with the optical axes of the active component 2 and of the passive component 1, but rather they are provided in a direction that is perpendicular to said optical axes. Markings 11 are provided in the top surface of the silica-on-silica structure 100 in a manner such that the abutments 41 on the heatsink 4 can be pressed therein, and the heatsink can be aligned relative to the passive component 1. In addition, the abutments 42 on the heatsink 4 are provided such that they can be positioned against the side walls 22 of the front surface 2b of the laser 2.

Solder spots S1, one of which is visible in FIG. 5, make it possible to hold the laser 2 stationary on the heatsink 4. The solder spots making it possible to fix the silica-on-silica structure 100 to the heatsink are not visible in this figure. Therefore, since the intermediate element 4 is fixed relative both to the passive component and to the active component, the two components are fixed and aligned relative to each other.

In the example shown FIG. 5, the cavity 5 is a non-through cavity. Therefore, in this case, the intermediate element 4, placed above the cavity, participates in encapsulating the active component. The arrows shown indicate the direction in which the heatgiven off by the laser 2 is removed.

All of the above-described examples relate to a device including one active component and one passive component. Naturally, it is quite possible, in similar manner, to make a device that includes a plurality of other passive components, a plurality of other cavities, and a plurality of other intermediate elements, each of which is assembled to an active component and to the silica-on-silica structure so that each active component is situated inside a cavity and is coupled optically to a passive component.

What is claimed is:

1. A hybrid optical device comprising:

an active component including a first positioning mechanism and coupled optically to a passive component including a second positioning mechanism, said passive component being formed in layers of silica on a substrate made of silica, said layers and said substrate thus forming a silica-on-silica structure, an intermediate element including a third positioning mechanism having a predetermined thermal conductivity and a coefficient of thermal expansion similar to that of the active component, and a cavity provided in the silica-on-silica structure, wherein the intermediate element is assembled both to the active component and to the silica-on-silica structure so that the active component is located inside the cavity and is coupled optically to the passive component and said first, second, and third positioning mechanisms contribute to align an optical axis of the active component with the passive component.

2. A device according to claim 1, wherein the first positioning mechanism comprises keying means, the second positioning mechanism comprises markings, and the third positioning mechanism comprises abutments, said abutments being suitable for being positioned firstly against said keying means situated on the active component, and secondly against said markings situated in the silica-on-silica structure.

3. A device according to claim 1, wherein the intermediate element is made of silicon.

4. A device according to claim 1, wherein the intermediate element is relatively very slightly greater in area than an area of the active component.

5. A device according to claim 1, wherein the intermediate element has an area smaller than one square millimeter, and wherein the silica-on-silica structure has an area larger than a few square millimeters.

6. A device according to claim 1, wherein the active component is mounted "the right way up" in the cavity.

7. A device according to claim 1, wherein the cavity is a non-through cavity, and wherein the intermediate element is placed above the cavity so as to participate in encapsulating the active component.

8. A hybrid optical device comprising:

an active component coupled optically to a passive component, said passive component being formed in layers of silica on a substrate made of silica, said layers and said substrate thus forming a silica-on-silica structure, a cavity provided in the silica-on-silica structure, and an intermediate element having a predetermined thermal conductivity and a coefficient of thermal expansion similar to that of the active component, wherein said intermediate element comprises first positioning means, said active component comprises second positioning means, and said silica-on-silica structure comprises third positioning means, such that said first positioning means and said second positioning means cooperate to align said intermediate element together with said active component, and said first positioning means and said third positioning means co-operate such that said intermediate element is aligned with said silica-on-silica structure, and the active component is located inside the cavity and is coupled optically to the passive component.

9. A hybrid optical device comprising:

an active component coupled optically to a passive component, said passive component being formed in layers of silica on a substrate made of silica, said layers and said substrate thus forming a silica-on-silica structure, an intermediate element having a predetermined thermal conductivity and a coefficient of thermal expansion similar to that of the active component, and a cavity provided in the silica-on-silica structure, wherein the intermediate element is assembled both to the active component and to the silica-on-silica structure so that the active component is located inside the cavity and is coupled optically to the passive component;

wherein the intermediate element includes abutments suitable for being positioned firstly against keying means situated on the active component, and secondly against markings situated in the silica-on-silica structure.

* * * * *